United States Patent
Torii

(10) Patent No.: US 8,154,766 B2
(45) Date of Patent: Apr. 10, 2012

(54) IMAGE PROCESSING DEVICE, IMAGE FORMING SYSTEM, IMAGE FORMING METHOD AND COMPUTER READABLE MEDIUM STORING PROGRAM

(75) Inventor: Takeshi Torii, Kawasaki (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 943 days.

(21) Appl. No.: 12/170,653

(22) Filed: Jul. 10, 2008

(65) Prior Publication Data

US 2009/0153892 A1 Jun. 18, 2009

(30) Foreign Application Priority Data

Dec. 17, 2007 (JP) ................................. 2007-324336

(51) Int. Cl.
*G06K 15/00* (2006.01)
*G06F 3/12* (2006.01)
(52) U.S. Cl. ....................................... 358/2.1; 358/1.13
(58) Field of Classification Search .................... 358/2.1, 358/1.13, 448, 1.15, 1.1
See application file for complete search history.

(56) References Cited

U.S. PATENT DOCUMENTS

| | | | | |
|---|---|---|---|---|
| 2004/0179218 | A1* | 9/2004 | Wissenbach | 358/1.13 |
| 2006/0221371 | A1* | 10/2006 | Ogasawara | 358/1.13 |

FOREIGN PATENT DOCUMENTS

| | | | |
|---|---|---|---|
| JP | 09-114813 | A | 5/1997 |
| JP | 10-151815 | A | 6/1998 |
| JP | 2001-134389 | A | 5/2001 |
| JP | 2002-182872 | A | 6/2002 |
| JP | 2002-251610 | A | 9/2002 |
| JP | 2002-351640 | A | 12/2002 |
| JP | 2004-192507 | A | 7/2004 |
| JP | 3589255 | B2 | 8/2004 |

OTHER PUBLICATIONS

Japanese Office Action dated Jan. 5, 2010 for Japanese Patent Application No. 2007-324336 and English translation.

* cited by examiner

*Primary Examiner* — Charlotte M Baker
(74) *Attorney, Agent, or Firm* — Sughrue Mion, PLLC

(57) ABSTRACT

An image processing device includes plural image processing units that perform image processing on print data; a delivery unit that delivers a whole set of print data formed of plural segments to the plural image processing units; and a sending unit that sends a processing request command that specifies which segment of print data should be subjected to image processing to the plural image processing units, respectively, each of the plural image processing units including a conversion unit that converts print data for a segment specified by the processing request command sent by the sending unit into image information as bitmap data for primary colors.

15 Claims, 6 Drawing Sheets

IMAGE PROCESSING DEVICE, IMAGE FORMING SYSTEM, IMAGE FORMING METHOD AND COMPUTER READABLE MEDIUM STORING PROGRAM

CROSS-REFERENCE TO RELATED APPLICATIONS

This application is based on and claims priority under 35 USC 119 from Japanese Patent Application No. 2007-324336 filed Dec. 17, 2007.

BACKGROUND

1. Technical Field

The present invention relates to an image processing device, an image forming system, an image processing method and a computer readable medium storing a program.

2. Related Art

To perform a large volume of printing at a high speed, generally, a continuous form printer (fanfold paper printer) that prints on continuous-form print paper is used. When high-speed printing is carried out with such a continuous form printer, processing for vector to raster (bitmap) data conversion (rasterizing) in a RIP (Raster Image Processing) part is a bottleneck in processing speed. There is a need to boost the processing speed of the RIP.

Print jobs described in a Page Description Language (PDL), particularly, those for independent pages are relatively easy to divide page by page. Hence, a method in which a PDL job file is divided and then processed in parallel by plural RIP parts is proposed.

According to such a method, a print job made up of plural pages is divided page by page and processed in parallel by plural RIP parts. Thus, print job processing can be done at a higher speed in comparison with a case where rasterizing for all pages is performed by a single RIP part.

However, there is a print job in PDL for independent pages, wherein a common drawing object is used by plural pages. If a print job of this type is divided page by page, the drawing object, commonly referred to by plural pages, has to be copied to each page into which the job is divided. Thus, due to copying data such as a common drawing object to each page into which the job is divided, additional processing time is taken for dividing a job. In addition, in each RIP part, overhead for initialization or the like increases. This situation nullifies the merit of job splitting and parallel processing.

For a print job in which pages cannot be identified before receiving the whole print job, the above method also poses a negative effect that print job delivery to each RIP part is to take place only after the whole print job has been received.

For example, in PDF (Portable Document Format) jobs, information for page extraction is appended to the end of a job. For a large PDF job in which it takes some time to complete its reception, job splitting cannot begin until its transfer is completed and this results in a throughput delay.

Moreover, the above method distributes all pages of a job at the start of the job and, hence, the processing loads (load balancing) across the pages cannot be adjusted and the job processing time becomes equal to the processing time of the slowest RIP part. This method cannot apply to a flexible system in which the order of pages to print may be dynamically changed as with an in-position function.

SUMMARY

According to an aspect of the present invention, there is provided an image processing device including plural image processing units that perform image processing on print data; a delivery unit that delivers a whole set of print data formed of plural segments to the plural image processing units; and a sending unit that sends a processing request command that specifies which segment of print data should be subjected to image processing to the plural image processing units, respectively, each of the plural image processing units including a conversion unit that converts print data for a segment specified by the processing request command sent by the sending unit into image information as bitmap data for primary colors.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described with reference to the drawings.

[First Exemplary Embodiment]

Figure 1:
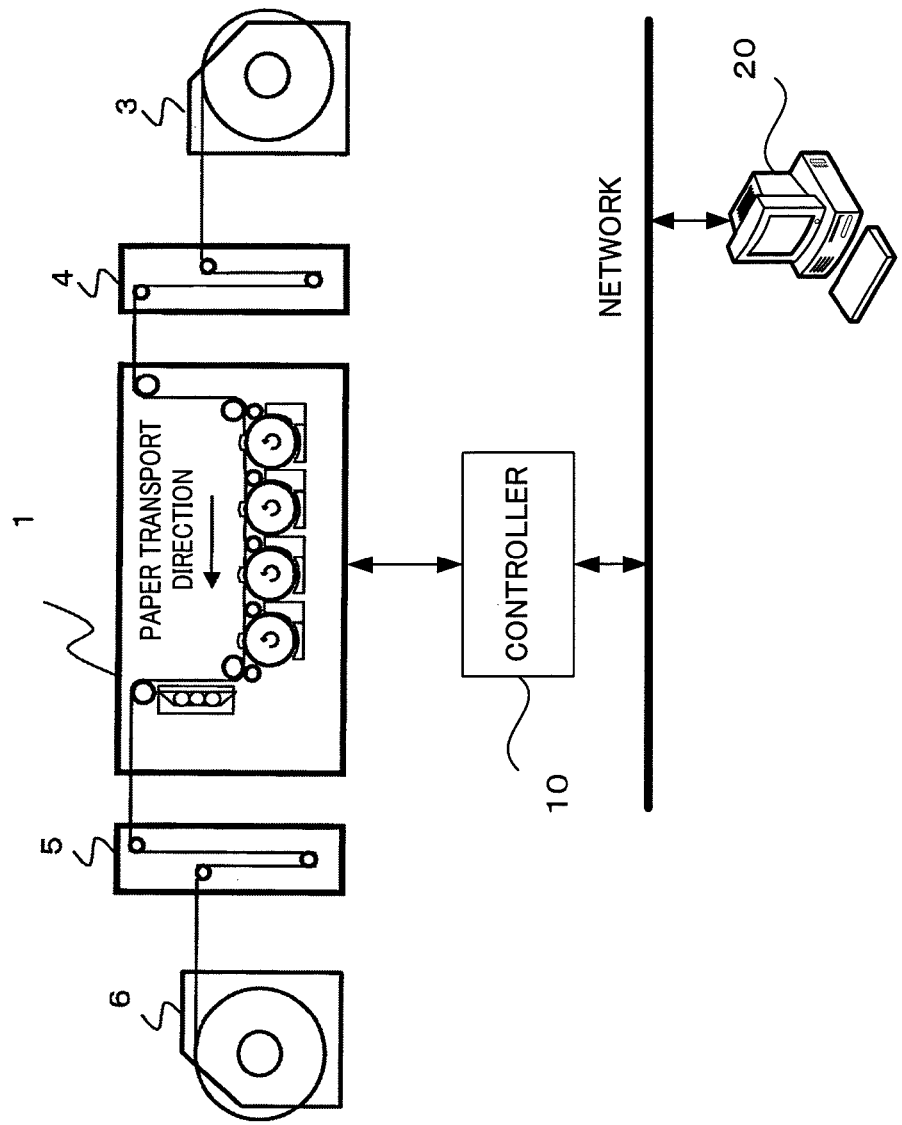
FIG. 1 depicts a framework of an image forming system in accordance with a first exemplary embodiment of the invention.

FIG. 1 depicts an example of a framework of an image forming system in accordance with a first exemplary embodiment of the invention. This image forming system is composed of a pre-processing device 3, a buffer device 4, a printer 1 which prints on continuous-form paper, a buffer device 5, a post-processing device 6, a controller 10, and a terminal device 20.

The pre-processing device 3 performs pre-processing such as feeding printing paper before being printed on. The post-processing device 6 performs post-processing such as rolling up printing paper after being printed on. Buffer devices 4, 5 are provided for, inter alia, keeping tension of printing paper between the pre-processing device 3 and the printer 1 and between the printer 1 and the post-processing device 6.

The terminal device 20 generates print data such as print jobs and transmits it to the controller 10 via a network. The controller 10 functions as an image processing device that controls the printing operation of the printer 1 according to print data transmitted from terminal device 20. The printer 1 outputs an image in accordance with print data on continuous-form paper under the control of the controller 10.

Figure 2:
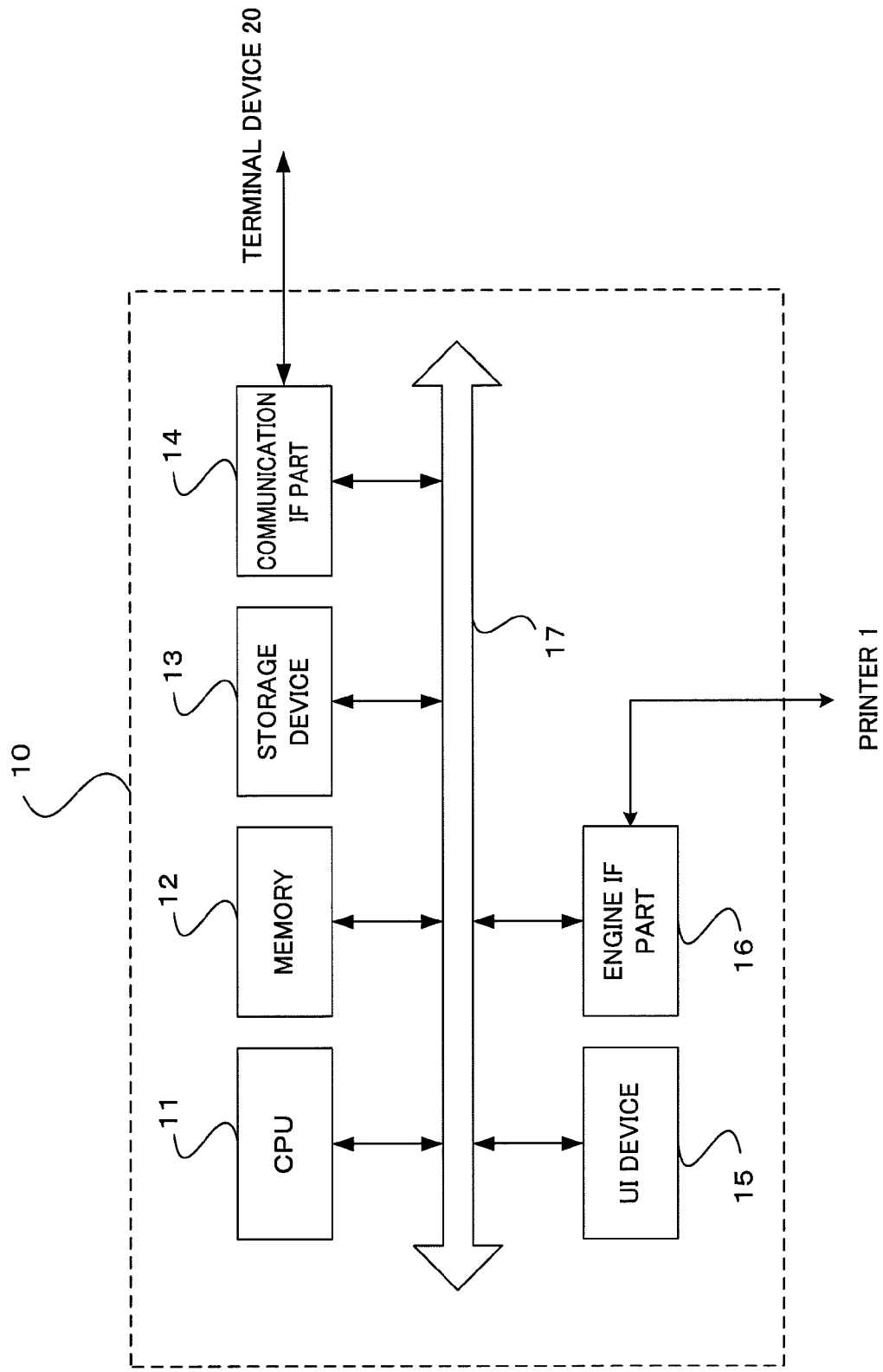
FIG. 2 is a block diagram schematically illustrating a hardware structure of a controller 10 in the image forming system of the first exemplary embodiment of the invention.

Next, a hardware structure of the controller 10 in the image forming system of the present exemplary embodiment is described with reference to FIG. 2. The controller in the present exemplary embodiment, as shown in FIG. 2, includes a CPU 11, a memory 12, a storage device 13 such as a hard disk drive (HDD), a communication interface (IF) part 24 for transmitting and receiving data to/from the terminal device 20 via the network, a user interface UI device 15 composed of a touch panel and a liquid crystal display, and an engine IF part 16 for transmitting and receiving data to/from the printer 1. These components are interconnected via control bus 17.

The CPU 11 executes prearranged processing based on a print control program stored in the memory 12 or storage device 13 and controls the operation of the controller 10.

Figure 3:
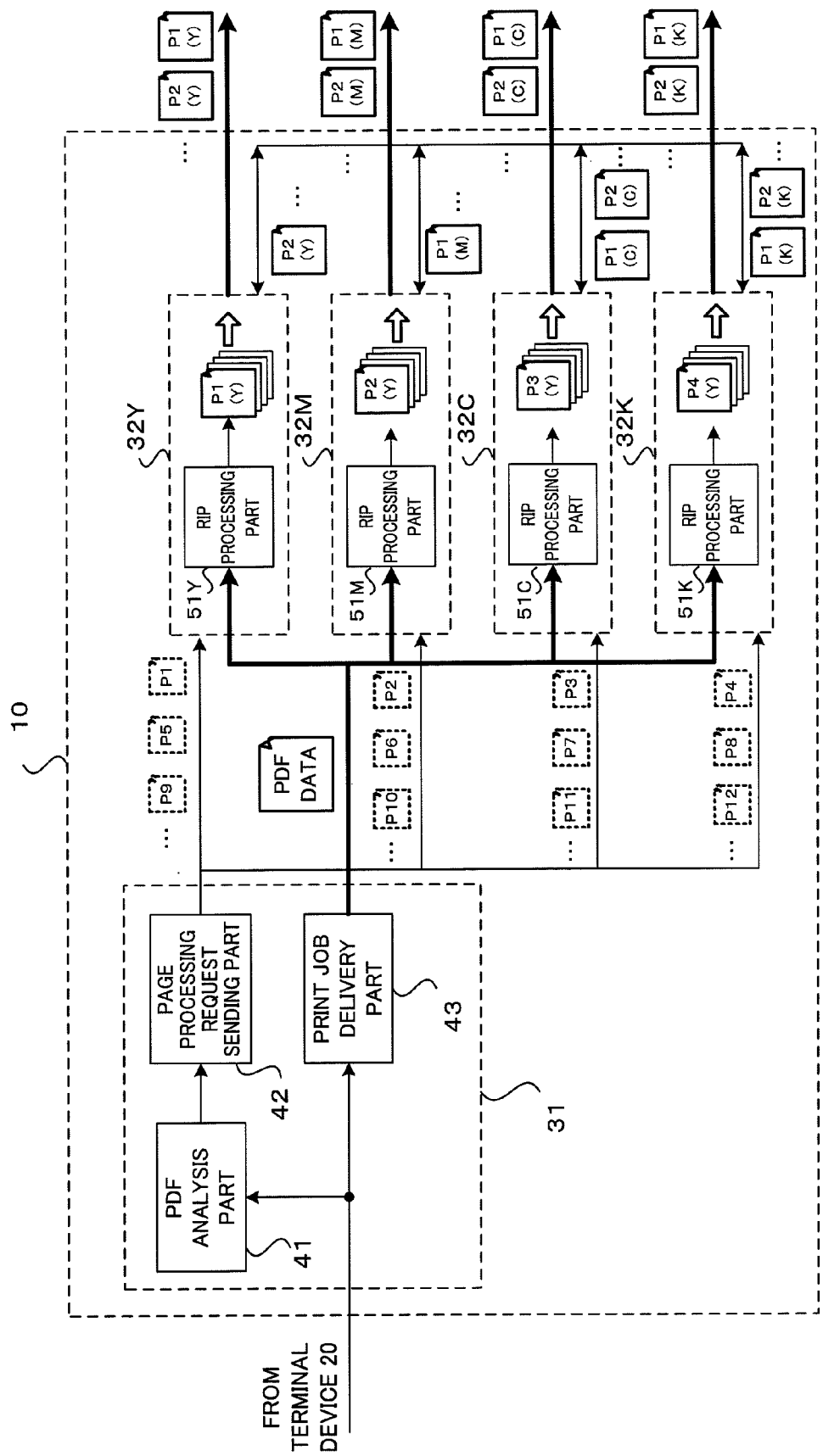
FIG. 3 is a block diagram schematically illustrating an arrangement of functions of the controller 10 in the image forming system of the first exemplary embodiment of the invention.

FIG. 3 is a block diagram schematically illustrating an arrangement of functions of the controller 10 that are realized by execution of the above print control program.

As shown in FIG. 3, the controller 10 includes a print job distribution part 31 and four image processing parts 32Y to 32K which perform image processing on print data, each being responsible for each of assigned primary colors.

The assigned primary colors are the colors that are handled by plural printing units which are responsible for primary print colors, respectively. For example, if the primary print colors are four colors of yellow, magenta, cyan, and black, the assigned primary colors correspond to these colors which are handled by the responsible printing units, respectively.

The print job distribution part 31 has a function to handle print jobs transmitted from the terminal device 20, based on their attributes. This part is composed of a PDF analysis part 41, a page processing request sending part 42, and a print job delivery part 43.

Although, in the present exemplary embodiment, an explanation is given using a PDF job as an example of a print job for independent pages, the present invention is equally applicable to any print job for independent pages.

The print job delivery part 43 delivers a whole print job made up of plural pages transmitted from the terminal device 20 to the four image processing parts 32Y to 32K.

Upon arrival of PDF data, which is a print job for independent pages, transmitted from the terminal device 20, the PDF analysis part 41 analyzes its attribute such as the number of pages contained the PDF.

Referring to the result of analysis done by the PDF analysis part 41, the page processing request sending part 42 sends a processing request command that specifies which page in the print job should be subjected to image processing to the four image processing parts 32Y to 32K, respectively.

Further, the image processing parts 32Y to 32K, respectively, include RIP processing parts 51Y to 51K that convert print data for pages specified by the processing request command transmitted by the page processing request sending part 42 into image information as YMCK bitmap data.

The image processing parts 32Y to 32K, each is provided with a function to transfer image information (bitmap data) for colors other than its assigned primary color among image information (bitmap data) for all primary colors produced by the RIP processing parts 51Y to 51K to the corresponding image processing parts for other primary colors. Further, each image processing part is provided with a function to output to the printer 1 the image information (bitmap data) for its assigned primary color produced by the associated one of the RIP processing parts 51Y to 51K as well as the image information (bitmap data) for its assigned primary color transferred from other image processing parts.

Figure 4:
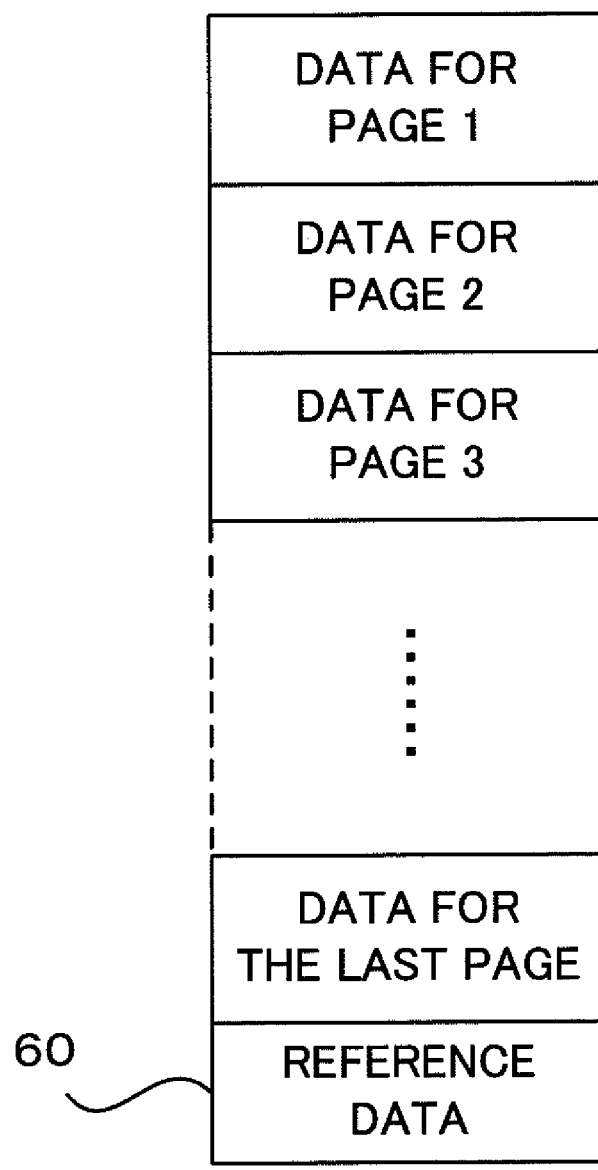
FIG. 4 illustrates a typical structure of PDF data.

Then, a typical structure of PDF data is described with reference to FIG. 4.

At the tail end of a file of PDF data, there is reference data 60. The reference data 60 is reference information indicating the position of various data within the file. The position of data within the file is represented by the number of bytes as an offset of the top of the data from the top of the file. In other words, necessary data for creating a certain page can be found, without reading the whole of the file, by referring to the reference data 60.

By referring to the reference data 60, the PDF analysis part 41 can have direct access to page index information of PDF data transmitted from the terminal device 20 and thus obtain the number of pages and others easily.

Then, the operation of the controller 10 in the image forming system of the present exemplary embodiment is described in detail with reference to the drawings.

Upon arrival of a print job as PDF data transmitted from the terminal device 20, the PDF data is delivered by the print job delivery part 43 to the image processing parts 32Y to 32K each responsible for each of the primary colors, wherein the print job is delivered as a whole job file without being divided.

In the print job distribution part 31, at receiving a print job from the terminal device 20, processing such as dividing the job page by page does not take place. Even before receiving the end of a print job file, its delivery to each of the image processing parts 32Y to 32K begins. The print job delivery part 43 may deliver the print job to each of the image processing parts 32Y to 32K by using multicast or broadcast.

In the PDF analysis part 41, analysis of PDF data transmitted from the terminal device 20 is performed. The page processing request sending part 42 sends a processing request command that specifies which page should be subjected to image processing to the image processing parts 32Y to 32K.

Referring to the example shown in FIG. 3, a processing request command specifying that data for page 1 (P1), page 5 (P5), page 9 (P9), . . . should be submitted to image processing is sent to the image processing part 32Y.

Similarly, a processing request command specifying that data for page 2 (P2), page 6 (P6), page 10 (P10), . . . should be submitted to image processing is sent to the image processing part 32M. A processing request command specifying that data for page 3 (P3), page 7 (P7), page 11 (P11), . . . should be submitted to image processing is sent to the image processing part 32C. A processing request command specifying that data for page 4 (P4), page 8 (P8), page 12 (P12), . . . should be submitted to image processing is sent to the image processing part 32K.

In the image processing part 32Y, the first page in the whole PDF data delivered to it by the print job delivery part 43 is first rasterized, that is, converted into image information as YMCK bitmap data by the RIP processing part 51Y. Among the rasterized image information, then, the image processing part 32Y transfers image information (bitmap data) for magenta P1 (M) to the image processing part 32M, image information (bitmap data) for cyan P1 (C) to the image processing part 32C, and image information (bitmap data) for black P1 (K) to the image processing part 32K.

Likewise, in the image processing part 32M, the second page in the whole PDF data delivered to it by the print job delivery part 43 is first rasterized, that is, converted into image information as YMCK bitmap data by the RIP processing part 51M. Among the rasterized image information, then, the image processing part 32M transfers image information (bitmap data) for yellow P2 (Y) to the image processing part 32Y, image information (bitmap data) for cyan P2 (C) to the image processing part 32C, and image information (bitmap data) for black P2 (K) to the image processing part 32K.

In this way, each page data is rasterized in order in the image processing parts 32Y to 32K and obtained image information as YMCK bitmap data is transferred to the appropriate image processing parts for the assigned colors. The image processing parts 32Y to 32K, each transfers image information (bitmap data) for its assigned color to the printing mechanical section responsible for the same color in the printer 1.

In the example shown in FIG. 3, the image processing parts 32Y to 32K, each is composed of a single RIP processing part. Alternatively, each image processing part may be composed of plural RIP processing parts (rasterizing units) so that processing for print data to bitmap conversion is parallelized for pages specified by the processing request command.

Figure 5:
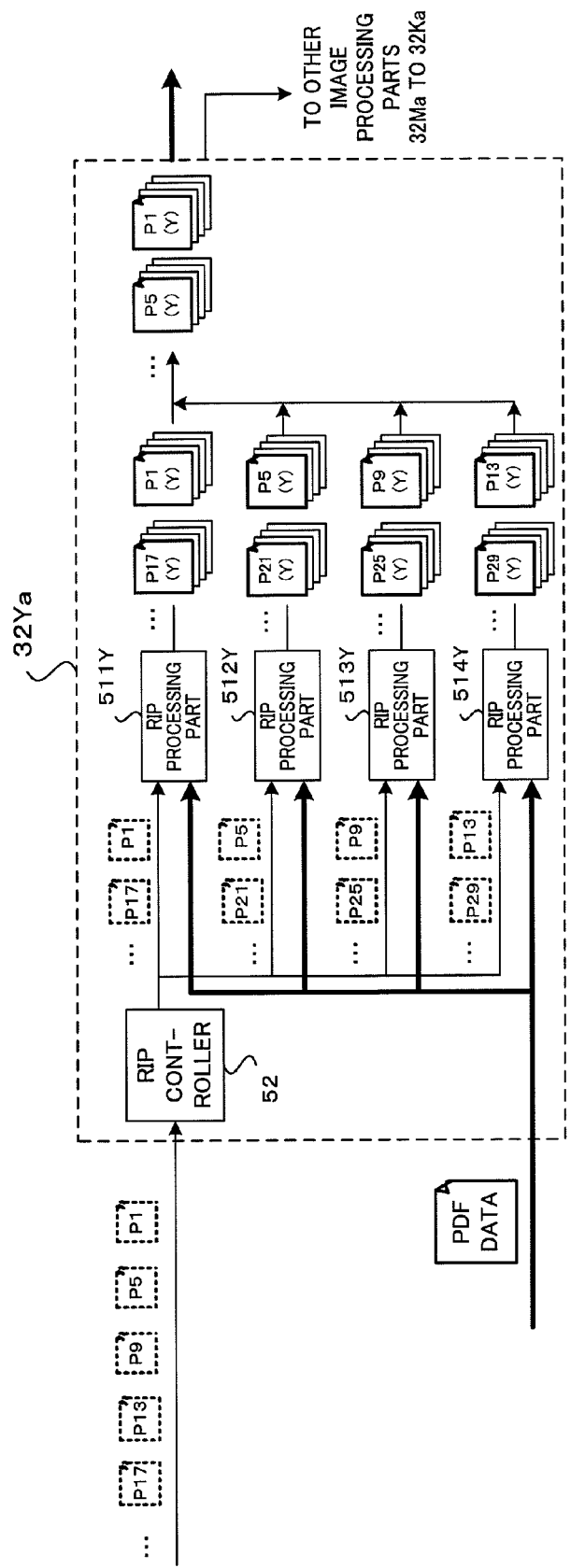
FIG. 5 is a block diagram schematically illustrating a structure of an image processing part 32Ya.

For example, an image processing part 32Ya composed of four RIP processing parts is shown in FIG. 5. Referring to FIG. 5, the image processing part 32Ya is made up of four RIP processing parts 511Y to 514Y and a RIP controller 52.

Each of the RIP processing parts 511Y to 514Y performs rasterizing of print data for a specified page under the control of the RIP controller 52. Referring to the example shown in FIG. 5, the RIP processing part 511Y is controlled by the RIP controller 52 to rasterize page 1 (P1) and page 17 (p17) data.

Each of the image processing parts 32Y to 32K may include plural rasterizing units that carry out parallel processing for conversion of print data. A number of the rasterizing units to be used may be variable. The RIP controller 52 may determine the number of the rasterizing units to be used based on at least one of a print job characteristic including a job amount to be processed, performance of a CPU to be used for a processing, and memory resource.

[Second Exemplary Embodiment]

Next, an image forming system in accordance with a second exemplary embodiment of the invention is described.

Figure 6:
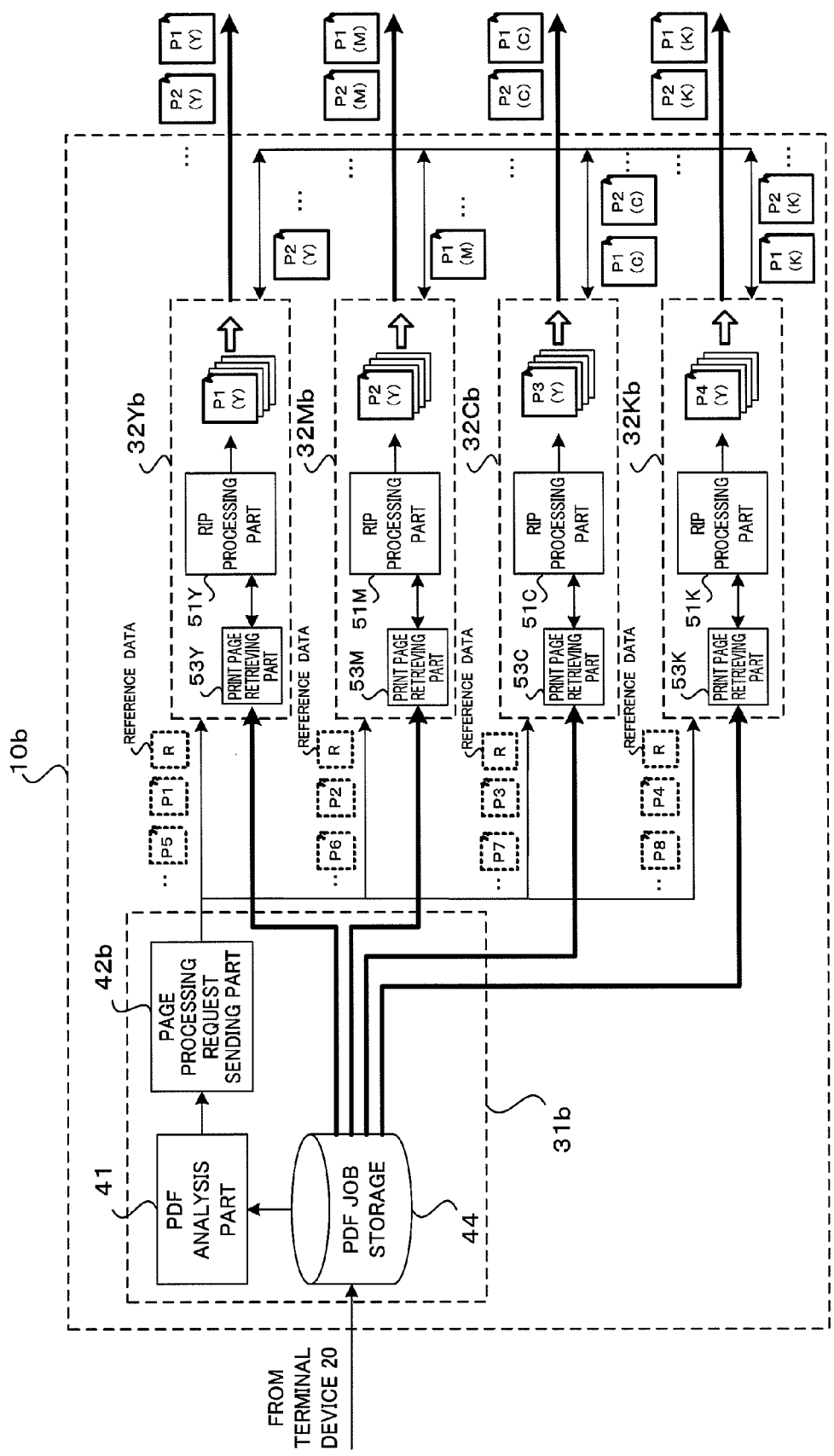
FIG. 6 is a block diagram schematically illustrating an arrangement of functions of a controller 10b in the image forming system of a second exemplary embodiment of the invention.

In the image forming system of the second exemplary embodiment of the invention, a controller 10b which is shown in FIG. 6 supersedes the controller 10 in the image forming system of the first exemplary embodiment shown in FIG. 1.

The controller 10b in the image forming system of the present exemplary embodiment, as shown in FIG. 6, includes a print job distribution part 31b and image processing part 32Yb to 32Kb. In FIG. 6, components corresponding to those shown in FIG. 3 are assigned the same reference numbers and their explanation is not repeated.

The print job distribution part 31b is composed of a PDF analysis part 41, a page processing request sending part 42b, and a PDF job storage 44.

The image processing parts 32Yb to 32Kb per primary color, respectively, include RIP processing parts 51Y to 51K and print page retrieving parts 53Y to 53K.

The PDF job storage 44 stores a PDF job made up of plural pages.

The page processing request sending part 42b sends a processing request command that specifies which page in the print data should be subjected to image processing as well as reference information for accessing PDF data stored in the PDF job storage 44 to the four image processing parts 32Yb to 32Kb, respectively.

Each of the print page retrieving parts 53Y to 53K retrieves print data for pages specified by the processing request command from the PDF job storage 44, based on the reference data sent by the page processing request sending part 42b.

The RIP processing parts 51Y to 51K in the present exemplary embodiment convert print data for specified pages retrieved by the print page retrieving parts 53Y to 53K into image information as YMCK bitmap data.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes that come within the meaning and range of equivalency of the claims are to be embraced within their scope.

What is claimed is:

1. An image processing device comprising:
   a plurality of image processing units that perform image processing on print data;
   a delivery unit that delivers a whole set of print data formed of a plurality of segments to each of the plurality of image processing units; and
   a sending unit that sends a processing request command that specifies which segments of the print data should be subjected to image processing by the image processing unit to each of the plurality of image processing units, respectively,
   each of the plurality of image processing units including a conversion unit that converts the print data for a segment specified in accordance with the processing request command sent by the sending unit into image information as bitmap data for a plurality of colors.

2. The image processing device according to claim 1, wherein each of the plurality of image processing units is assigned a main color and includes:
   a transfer unit that transfers the bitmap data for colors other than the assigned main color of the image processing unit among the bitmap data for all colors produced by the conversion unit to corresponding image processing units for the other assigned main colors; and
   an output unit that outputs, to an image forming device, the bitmap data for the assigned main color of the image processing unit produced by the conversion unit and the bitmap data for the assigned main color of the image processing unit transferred by the transfer units of the other image forming units.

3. The image processing device according to claim 1, wherein the conversion unit includes a plurality of rasterizing units that carry out parallel processing for conversion of print data for the segments specified by the processing request command.

4. The image processing device according to claim 3, further comprising a RIP controller that determines a number of the rasterizing units to be used for the parallel processing based on at least one of a print job characteristic including a job amount to be processed, performance of a CPU to be used for a processing, and memory resource.

5. The image processing device according to claim 1,
   wherein a set of print data formed of a plurality of segments is Portable Document Format (PDF) data, and
   a segment of print data that is specified by the processing request command sent by the sending unit is in units of pages.

6. The image processing device according to claim 1, wherein the delivery unit delivers the whole set of print data by using multicast or broadcast.

7. The image processing device according to claim 1, wherein the segments of print data are pages of print data.

8. An image processing device comprising:
   a plurality of image processing units that perform image processing on print data;
   a storage unit that stores a set of print data formed of a plurality of segments; and
   a sending unit that sends a processing request command that specifies which segment of print data should be subjected to image processing as well as reference information for accessing print data stored in the storage unit to the plurality of image processing units, respectively;

each of the plurality of image processing units including:
- a retrieving unit that retrieves print data for a segment specified by the processing request command from the storage unit, based on the reference information sent by the sending unit; and
- a conversion unit that converts print data for a specified segment retrieved by the retrieving unit into image information as bitmap data for primary colors.

9. The image processing device according to claim 8, wherein the conversion unit includes a plurality of rasterizing units that carry out parallel processing for conversion of print data for a segment specified by the processing request command.

10. The image processing device according to claim 9, further comprising a RIP controller that determines a number of the rasterizing units to be used for the parallel processing based on at least one of a print job characteristic including a job amount to be processed, performance of a CPU to be used for a processing, and memory resource.

11. The image processing device according to claim 8,
- wherein a set of print data formed of a plurality of segments is PDF (portable Document Format) data, and
- a segment of print data that is specified by the processing request command sent by the sending unit is in units of pages.

12. The image processing device according to claim 8, wherein each of the plurality of image processing units includes:
- a transfer unit that transfers image information (bitmap data) for colors other than the assigned primary color of the image processing unit among image information (bitmap data) for all primary colors produced by the conversion unit to corresponding image processing units for other primary colors; and
- an output unit that outputs, to an image forming device, the image information (bitmap data) for the assigned primary color of the image processing unit produced by the conversion unit as well as the image information (bitmap data) for the assigned primary color of the image processing unit transferred by the transfer unit.

13. A non-transitory computer readable medium storing a program including instructions causing a computer to perform a process comprising:
- delivering a whole set of print data formed of a plurality of segments to each of a plurality of image processing units that perform image processing on print data;
- sending a processing request command that specifies which segments of the print data should be subjected to image processing by the image processing unit to the plurality of image processing units, respectively; and
- converting the print data for a segment specified in accordance with the processing request command received into image information as bitmap data for a plurality of colors in each of the plurality of image processing units.

14. An image processing method comprising:
- delivering a whole set of print data formed of a plurality of segments to each of a plurality of image processing units that perform image processing on print data;
- sending a processing request command that specifies which segments of the print data should be subjected to image processing by the image processing unit to the plurality of image processing units, respectively; and
- converting the print data for a segment specified in accordance with the processing request command received into image information as bitmap data for a plurality of colors in each of the plurality of image processing units.

15. An image forming system comprising:
- an image processing device including a plurality of image processing units that perform image processing on print data; a delivery unit that delivers a whole set of print data formed of a plurality of segments to each of the plurality of image processing units; and a sending unit that sends a processing request command that specifies which segments of the print data should be subjected to image processing by the image processing unit to the plurality of image processing units, respectively, each of the plurality of image processing units including a conversion unit that converts the print data for a segment specified in accordance with the processing request command sent by the sending unit into image information as bitmap data for a plurality of colors; and
- an image forming device that forms an image based on the bitmap data output by the image processing device.

* * * * *